(12) United States Patent
Min (10) Patent No.: US 10,713,911 B1
(45) Date of Patent: Jul. 14, 2020

(54) MOTION DETECTION SYSTEM HAVING DUAL MOTION SENSORS AND METHODS OF USING THE SAME

(71) Applicant: NANJING EASTHOUSE ELECTRICAL CO., LTD., Nanjing (CN)

(72) Inventor: Hao Min, Nanjing (CN)

(73) Assignee: NANJING EASTHOUSE ELECTRICAL CO., LTD., Nanjing (CN)

(*) Notice: Subject to any disclaimer, the term of this patent is extended or adjusted under 35 U.S.C. 154(b) by 0 days.

(21) Appl. No.: 15/572,546

(22) PCT Filed: Oct. 25, 2017

(86) PCT No.: PCT/CN2017/107657
§ 371 (c)(1),
(2) Date: Nov. 8, 2017

(87) PCT Pub. No.: WO2019/080004
PCT Pub. Date: May 2, 2019

(51) Int. Cl.
*G08B 13/19* (2006.01)
*G08B 29/18* (2006.01)
(Continued)

(52) U.S. Cl.
CPC ............ *G08B 13/19* (2013.01); *G01S 13/505* (2013.01); *G01S 13/52* (2013.01); *G08B 29/185* (2013.01)

(58) Field of Classification Search
CPC ..... G08B 13/19; G08B 29/185; G01S 13/505; G01S 13/52
(Continued)

(56) References Cited

U.S. PATENT DOCUMENTS 5,189,393 A * 2/1993 Hu ..................... G08B 13/1645
315/158
6,380,882 B1 * 4/2002 Hegnauer ............. G01S 13/348
340/554
(Continued)

FOREIGN PATENT DOCUMENTS

| CN | 101534470 A | 9/2009 |
| CN | 105738874 A | 7/2016 |
| EP | 2146222 A2 | 1/2010 |

OTHER PUBLICATIONS

Liu Nan, WIPO Search Report, dated Aug. 1, 2018.
Liu Nan, ISA Written Opinion, dated Aug. 1, 2018.

*Primary Examiner* — Kerri L McNally
(74) *Attorney, Agent, or Firm* — Ming Jiang; MM IP Services LLC (57) ABSTRACT

The present disclosure relates to a dual motion detection system. In certain embodiments, the dual motion detection system includes: at least one passive infrared (PIR) motion detection device, at least one radio frequency doppler (RFD) motion detection device, and a dual motion detection system controller. A power module of the dual motion detection system controller provides electrical power to PIR motion detection device continuously to enable the PIR motion detection device to detect object motion. The power module provides electrical power to the RFD motion detection device only when PIR motion detection device detects object motion during a period of time TW. The RFD motion detection device is used to confirm a positive PIR motion detection by the PIR motion detection device and reduce false motion detection using single motion detection device and reduce electrical power consumption of the dual motion detection system.

20 Claims, 7 Drawing Sheets

(51) Int. Cl.
*G01S 13/52* (2006.01)
*G01S 13/50* (2006.01)

(58) Field of Classification Search
USPC .......................................................... 340/541
See application file for complete search history.

(56) References Cited

U.S. PATENT DOCUMENTS

| | | | |
|---|---|---|---|
| 2002/0175815 A1* | 11/2002 | Baldwin | H05B 47/105 340/567 |
| 2008/0218340 A1* | 9/2008 | Royer | G08B 29/20 340/567 |
| 2009/0121870 A1* | 5/2009 | Green | G08B 29/26 340/554 |
| 2010/0302090 A1* | 12/2010 | Wu | G08B 13/2494 342/160 |
| 2014/0292507 A1* | 10/2014 | Null | G08B 13/1645 340/523 |
| 2015/0212205 A1* | 7/2015 | Shpater | G01S 13/38 342/28 |

* cited by examiner

MOTION DETECTION SYSTEM HAVING DUAL MOTION SENSORS AND METHODS OF USING THE SAME

FIELD

The present disclosure generally relates to electronic surveillance, and more particularly to motion detection systems having dual motion sensors and methods of using the motion detection systems.

BACKGROUND

Figure 1:
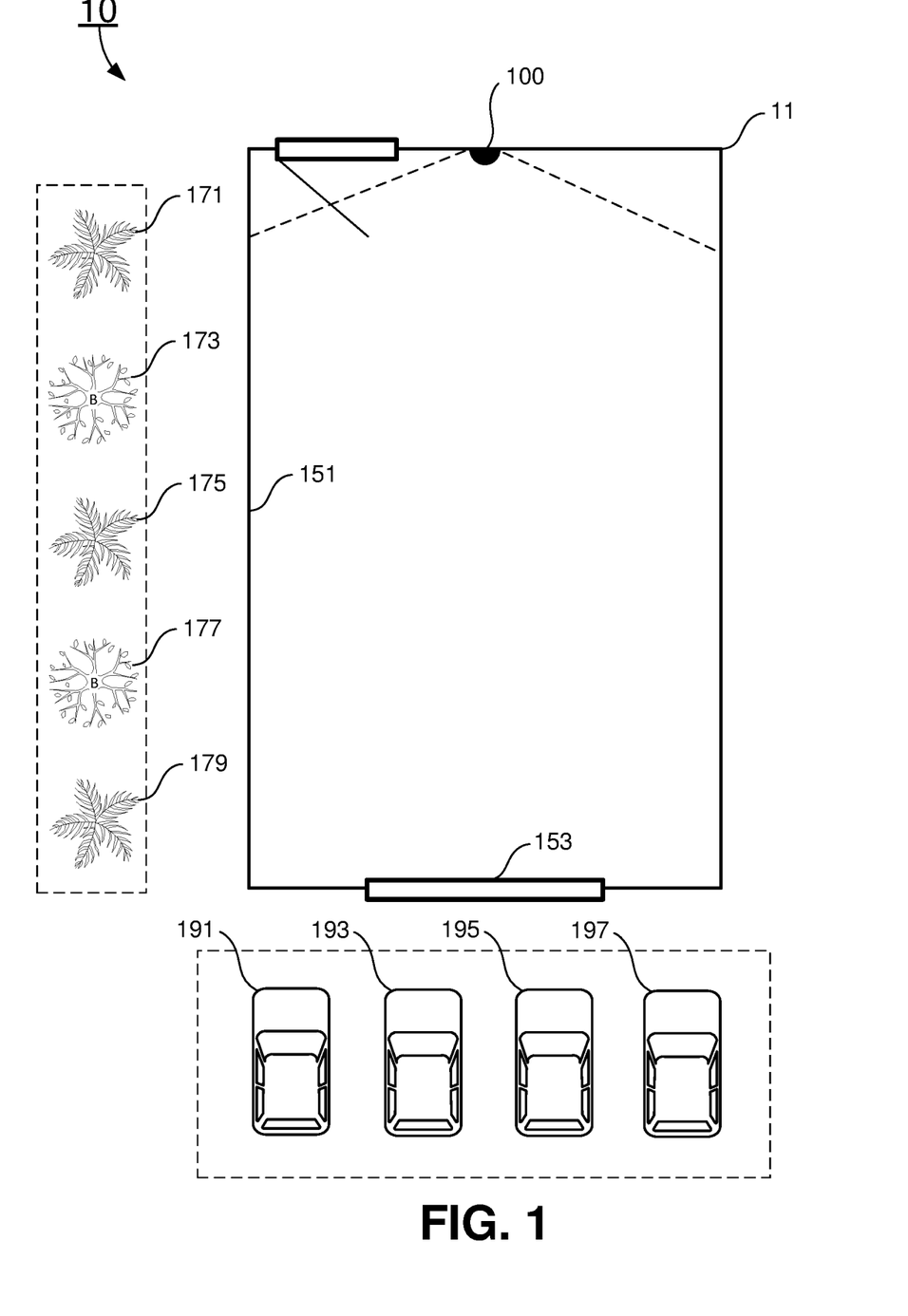
FIG. 1 schematically shows an area being monitored by a motion sensor according to one embodiment of present disclosure.

In security monitoring systems, accuracy of motion and intrusion sensors are very important. Currently, motion sensors commonly used for security monitoring systems include passive infrared (PIR) motion sensors and radio frequency doppler (RFD) motion sensors. Power consumption of the passive infrared motion sensors is very low and it is suitable for battery powered security monitoring system applications. The disadvantages of using PIR motion sensors include high false alarm rate. For example, as shown in FIG. 1, vehicles 191, 193, 195, and 197 parked outside of a window 153 may emit certain amount of infrared radiation through the window 153. A PIR motion sensor 100 installed on one side of an area 11 may detect the infrared radiation from vehicles 193 and 195 through the window 153. If the vehicles 193 and 195 drive into or out of the parking spots, the sensor 100 may detect the vehicle motion and trigger an alarm system the sensor 100 is connected to so that a false alarm is raised. On the other hand, RFD motion sensors detect object motion by detecting doppler effects of radio wave reflection of the moving object. For example, as shown in FIG. 1, movements of a few trees, including 171, 173, 175, 177, and 179 outside of the area 11 may be detected by a RFD motion sensor 100 because the radio frequency radiation of the RFD motion sensor is able to penetrate a wall 151. The RFD motion sensors is not sensitive to infrared radiation, but power consumption of the RFD motion sensors is relatively high and it is not suitable for battery powered security monitoring system application continuously operating for a long time. Additionally, when more than one RFD motion sensors having similar radio frequency ranges are used in an area at the same time, different RFD motion sensors may interfere with each other and cause false alarms.

Therefore, a heretofore unaddressed needs still exist in the art to address the aforementioned deficiencies and inadequacies.

SUMMARY

In one aspect, the present disclosure relates to a dual motion detection system. In certain embodiments, the dual motion detection system includes: at least one passive infrared (PIR) motion detection device, at least one radio frequency doppler (RFD) motion detection device, and a dual motion detection system controller. The PIR motion detection device detects motion of an object radiating infrared light and generates a positive PIR motion detection signal when the PIR motion detection device detects object motion. The RFD motion detection device detects motion of the object using doppler effect and generates a positive RFD motion detection signal when the RFD motion detection device detects object motion. The dual motion detection system controller includes a power module for providing electrical power to the PIR motion detection device and the RFD motion detection device, a logic control module for receiving the positive PIR motion detection signal and the positive RFD motion detection signal, and a motion detection output module for generating a positive motion detection output signal of the dual motion detection system when the logic control module receives the positive PIR motion detection signal and the positive RFD motion detection signal simultaneously.

In certain embodiments, the power module provides a PIR electrical power to the PIR motion detection device to allow the PIR motion detection device to detect object motion. When the PIR motion detection device detects object motion, the PIR motion detection device generates the positive PIR motion detection signal and transmits the positive PIR motion detection signal to the logic control module, and the logic control module sends a power on signal to the power module to turn on a RFD electrical power to the RFD motion detection device for a period of time TW to allow the RFD motion detection device to detect motion. When the RFD motion detection device detects object motion, the RFD motion detection device generates the positive RFD motion detection signal and transmits the positive RFD motion detection signal to the logic control module. The power module turns off the RFD electrical power to the RFD motion detection device at the end of period of time TW. When the logic control module receives the positive PIR motion detection signal and the positive RFD motion detection signal simultaneously during the period of time TW, the motion detection output module provides the positive motion detection output signal of the dual motion detection system indicating the dual motion detection system has detected object motion.

In another aspect, the present disclosure relates to a motion detection system. In certain embodiments, the motion detection system includes, one or more dual motion detection devices, and a dual motion detection system controller. Each of the dual motion detection devices includes a PIR motion detector for detecting object motion using infrared and a RFD motion detector for detecting object motion using doppler effect. The dual motion detection system controller includes a power module, a motion detection input module, and a motion detection output module. The power module provides electrical power to each of the dual motion detection devices. The motion detection input module receives positive PIR motion detection signals from each of the PIR motion detectors and positive RFD motion detection signals from each of the RFD motion detectors. The motion detection output module generates a positive motion detection output signal of the motion detection system when at least one dual motion detection device detects object motion. The dual motion detection device detects object motion when the motion detection input module receives a positive PIR motion detection signal from the PIR motion detector of the dual motion detection device and a positive RFD motion detection signal from the corresponding RFD motion detector simultaneously.

In certain embodiments, when a second PIR motion detector of a subsequent second dual motion detection device detects object motion and transmits a second positive PIR motion detection signal to the motion detection input module, the computer executable instructions cause the processor to instruct the power module to provide another RFD electrical power to a second RFD motion detector of the second dual motion detection device for a period of time TW to allow the second RFD motion detector to detect motion, and the RFD electrical power is turned on after the end of the first period of time TW plus a time delay TD, and instruct the motion detection output module to provide the positive motion detection output signal of the motion detection system when the motion detection input module receives the second positive PIR motion detection signal from the second PIR motion detector and the second positive RFD motion detection signal from the second RFD motion detector simultaneously.

In yet another aspect, the present disclosure relates to a method of using a motion detection system to detect object motion. In certain embodiments, the method includes installing, by a user, the motion detection system. The motion detection system includes a dual motion detection system controller and one or more dual motion detection devices. Each of the dual motion detection devices includes a passive infrared (PIR) motion detector for detecting object motion using infrared and a radio frequency doppler (RFD) motion detector for detecting object motion using doppler effect.

In certain embodiments, the method also includes: providing, by the power module, a PIR electrical power to each PIR motion detector device of the dual motion detection devices, sending, by the motion detection input module, a power on signal to the power module to turn on a RFD electrical power to the corresponding RFD motion detector for a period of time TW to allow the RFD motion detector to detect motion, when a first PIR motion detector detects object motion and transmits a first positive PIR motion detection signal to the motion detection input module.

When the first corresponding RFD motion detector detects object motion, the method also includes receiving, by the motion detection input module, a first positive RFD motion detection signal from a first corresponding RFD motion detector, and generating, by the motion detection output module of the dual motion detection system controller, a positive motion detection output signal of the motion detection system indicating the motion detection system has detected object motion.

In certain embodiments, when a second PIR motion detector of a subsequent second dual motion detection device detects object motion and transmits a second positive PIR motion detection signal to the motion detection input module, the method further comprises: providing, by the power module, another RFD electrical power to a second RFD motion detector of the second dual motion detection device for a period of time TW to allow the second RFD motion detector to detect motion. The RFD electrical power is turned on after the end of the first period of time TW plus a time delay TD.

In certain embodiments, the method further includes receiving, by the motion detection input module, a second positive RFD motion detection signal from the corresponding second RFD motion detector, when the corresponding second RFD motion detector detects object motion, and generating, by the motion detection output module of the dual motion detection system controller, another positive motion detection output signal of the motion detection system indicating the motion detection system has detected object motion.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the present disclosure, and features and benefits thereof, and together with the written description, serve to explain the principles of the present invention. Wherever possible, the same reference numbers are used throughout the drawings to refer to the same or like elements of an embodiment, and wherein.

DETAILED DESCRIPTION

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1 through 7, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

In security monitoring systems, accuracy of motion and intrusion sensors are very important. Currently, motion sensors commonly used for security monitoring systems include passive infrared (PIR) motion sensors and radio frequency doppler (RFD) motion sensors. Power consumption of the passive infrared motion sensors is very low and it is suitable for battery powered security monitoring system applications. The disadvantages of using PIR motion sensors include high false alarm rate. For example, as shown in FIG. 1, vehicles 191, 193, 195, and 197 parked outside of a window 153 may emit certain amount of infrared radiation through the window 153. When a PIR motion sensor 100 is installed on one side of an area 11, the PIR motion sensor 100 may detect the infrared radiation from vehicles 193 and 195 through the window 153. If the vehicles 193 and 195 drive into or out of the parking spots, the sensor 100 may detect the vehicle motion and trigger an alarm system the sensor 100 is connected to so that a false alarm may be raised.

On the other hand, RFD motion sensors detect object motion by detecting doppler effects of radio wave reflection of the moving object. For example, as shown in FIG. 1, movements of a few trees, including 171, 173, 175, 177, and 179 outside of the area 11 may be detected by a RFD motion sensor 100 because the radio frequency radiation of the RFD motion sensor is able to penetrate a wall 151. The RFD motion sensors is not sensitive to infrared radiation, but power consumption of the RFD motion sensors is relatively high and it is not suitable for battery powered security monitoring system application continuously operating for a long time. Additionally, when more than one RFD motion sensors having similar radio frequency ranges are used in the area at the same time, different RFD motion sensors may interfere with each other and cause false alarms. Therefore it is a challenge to reduce the false alarm rate, and reduce the power consumption of the RFD motion detection devices.

Figure 2:
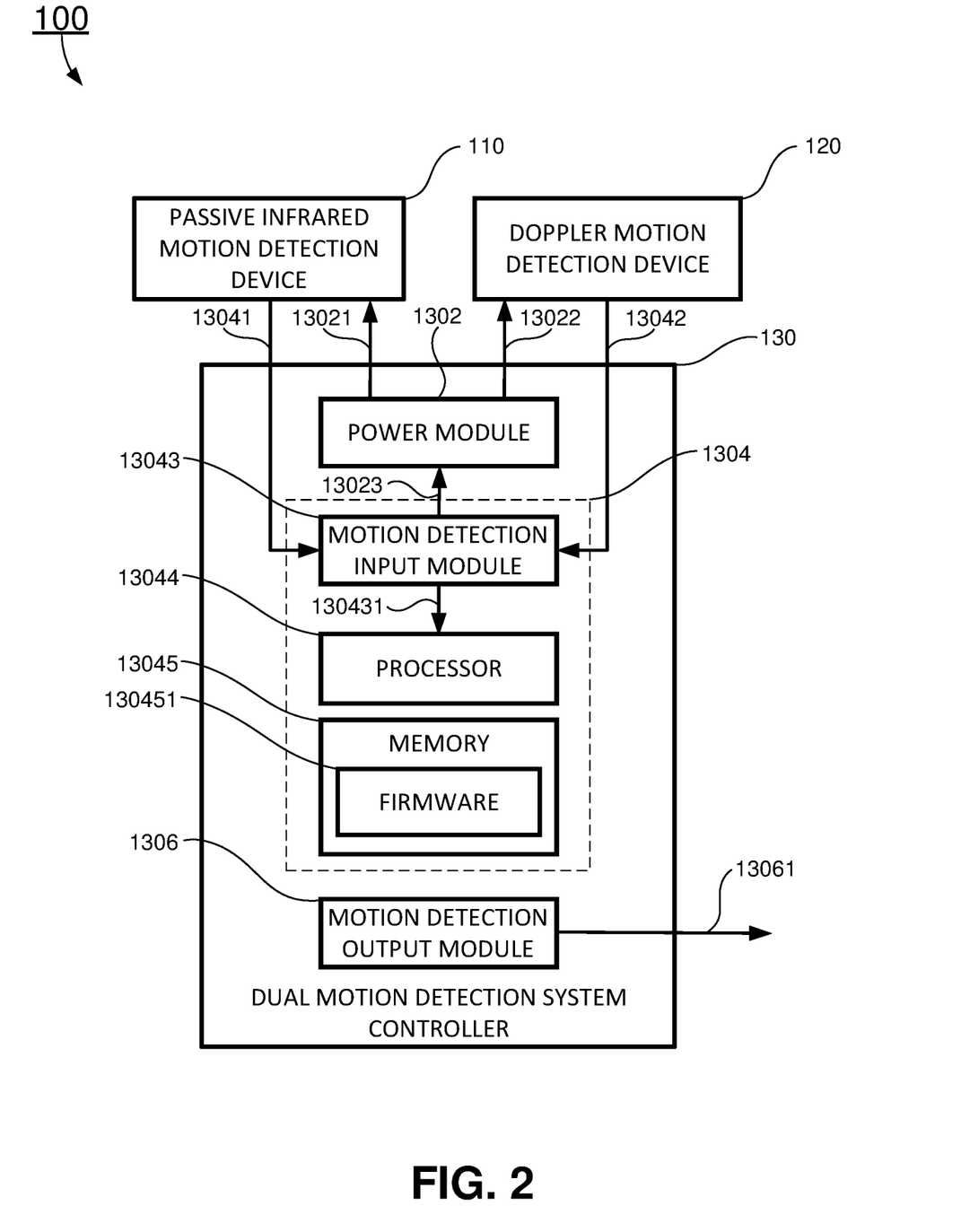
FIG. 2 shows a block diagram of an exemplary dual motion detection system according to one embodiment of the present disclosure.

In one aspect, the present disclosure relates to a dual motion detection system 100 as shown in FIG. 2. In certain embodiments, the dual motion detection system 100 includes: at least one PIR motion detection device 110, at least one RFD motion detection device 120, and a dual motion detection system controller 130. The PIR motion detection device 110 includes an input of a PIR electrical power 13021 and a positive PIR motion detection signal 13041 output. The PIR motion detection device 110 detects motion of an object radiating infrared light and generates the positive PIR motion detection signal 13041 when the PIR motion detection device 110 detects object motion. The RFD motion detection device 120 includes an input of a RFD electrical power 13022 and an output of a positive RFD motion detection signal 13042. The RFD motion detection device 120 detects motion of the object using doppler effect and generates the positive RFD motion detection signal 13042 when the RFD motion detection device 120 detects object motion. The RFD motion detection device 120 is used to confirm a positive PIR motion detection by the PIR motion detection device 110 and reduce false motion detection using single motion detection device.

In certain embodiments, the dual motion detection system controller 130 includes a power module 1302 for providing electrical power to the PIR motion detection device 110 and the RFD motion detection device 120, a logic control module 1304 for receiving the positive PIR motion detection signal 13041 and the positive RFD motion detection signal 13042, and a motion detection output module 1306 for generating a positive motion detection output signal 13061 of the dual motion detection system 100 when the logic control module 1304 receives the positive PIR motion detection signal 13041 and the positive RFD motion detection signal 13042 simultaneously. The power module 1302 includes a first output of the PIR electrical power 13021 to the PIR motion detection device 110, a second output of the RFD electrical power 13022 to the RFD motion detection device 120, and a power on signal input 13023 from the logic control module 1304.

In certain embodiments, the power module 1302 provides the PIR electrical power 13021 to the PIR motion detection device 110 to allow the PIR motion detection device 110 to detect object motion. When the PIR motion detection device 110 detects object motion, the PIR motion detection device 110 generates the positive PIR motion detection signal 13041 and transmits the positive PIR motion detection signal 13041 to the logic control module 1304. The logic control module 1304 sends the power on signal 13023 to the power module 1302 to turn on a RFD electrical power 13022 to the RFD motion detection device 120 for a period of time TW to allow the RFD motion detection device 120 to detect motion. The RFD electrical power 13022 to the RFD motion detection device 120 is maintained for the period of time TW and will be shut off. When the RFD motion detection device 120 detects object motion, the RFD motion detection device 120 generates the positive RFD motion detection signal 13042 and transmits the positive RFD motion detection signal 13042 to the logic control module 1304. When the logic control module 1304 receives the positive PIR motion detection signal 13041 and the positive RFD motion detection signal 13042 simultaneously during the period of time TW, the motion detection output module 1306 provides the positive motion detection output signal 13061 of the dual motion detection system 100 indicating the dual motion detection system 100 has detected object motion.

Figure 4:
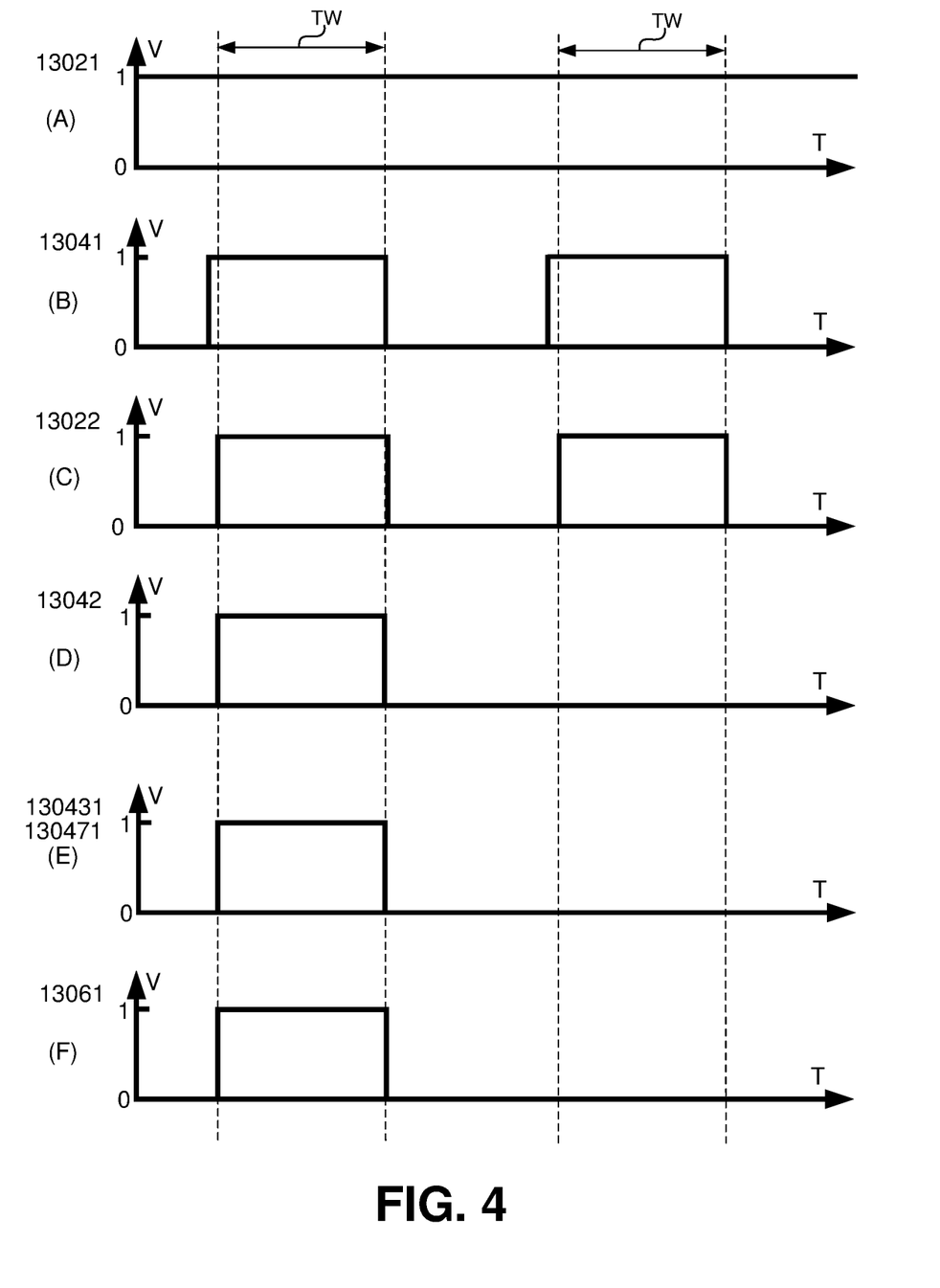
FIG. 4 shows a set of voltage waveforms of power supplies and motion detection signals at various points of motion detection devices of the dual motion detection system shown in FIGS. 2 and 3 according to certain embodiments of the present disclosure.

In certain embodiments, the power module 1302 provides the PIR electrical power 13021 to the PIR motion detection device 110 continuously as shown in waveform (A) of FIG. 4, and the power module 1302 provides the RFD electrical power 13022 as shown in waveform (C) of FIG. 4 to the RFD motion detection device 120 only when the PIR motion detection device 110 detects object motion and generates the positive PIR motion detection signal 13041 as shown in waveform (B) of FIG. 4 for the period of time TW. In this way, the RFD electrical power 13022 to the RFD motion detection device 120 is turned off most of the time, such that the electrical power consumption of the dual motion detection system 100 is greatly reduced, making it possible for the dual motion detection system 100 to use battery and sustain a long period of time of operations.

In one embodiment, the logic control module 1304 includes: a motion detection input module 13043, a processor 13044, and a memory 13045 as shown in FIG. 2. The motion detection input module 13043 includes a first input for receiving the positive PIR motion detection signal 13041 from the PIR motion detection device 110, and a second input for receiving the positive RFD motion detection signal 13042 from the RFD motion detection device 120. The RFD motion detection device 120 is used to confirm a positive PIR motion detection by the PIR motion detection device 110 and reduce false motion detection using single motion detection device. The motion detection input module 13043 also includes the power on signal output 13023 to the power module 1302, and a positive object motion detection signal output 130431 to the processor 13044 to indicate the positive object motion detection by the dual motion detection system 100.

In certain embodiments, the memory 13045 includes firmware 130451 and the firmware 130451 stores computer executable instructions. When the computer executable instructions are executed by the processor 13044, the computer executable instructions cause the processor to: instruct the power module 1302 to provide the PIR electrical power 13021 to the PIR motion detection device 110 to detect object motion, send the power on signal 13023 to the power module 1302 to provide the RFD electrical power 13022 as shown in a first half of waveform (C) of FIG. 4 to the RFD motion detection device 120 to detect object motion when the motion detection input module 13043 receives the positive PIR motion detection signal 13041. When the RFD motion detection device 120 detects object motion, the RFD motion detection device 120 generates the positive RFD motion detection signal 13042 and sends the positive RFD motion detection signal 13042 as shown in a first half of waveform (D) of FIG. 4 to the motion detection input module 13043. The motion detection input module 13043 sends a positive object motion detection signal 130431 as shown in a first half of waveform (E) of FIG. 4 to the processor 13044, and the processor 13044 instructs the motion detection output module 1306 to generate the positive motion detection output signal 13061 of the dual motion detection system 100 as shown in a first half of waveform (F) of FIG. 4.

When the PIR motion detection device 110 detects another object motion as shown in a second half of the waveform (B) of FIG. 4, the power module 1302 to provide the RFD electrical power 13022 as shown in a second half of the waveform (C) of FIG. 4 to the RFD motion detection device 120 to detect object motion when the motion detection input module 13043 receives the positive PIR motion detection signal 13041, the RFD motion detection device 120 does not detect object motion so the RFD motion detection device 120 does not generate the positive RFD motion detection signal 13042 a second half of the waveform (D) of FIG. 4, and the motion detection input module 13043 does not generate the positive object motion detection signal output 130431 a second half of the waveform (E) of FIG. 4, to the processor 13044, and therefore, the motion detection output module 1306 does not generate the positive motion detection output signal 13061 of the dual motion detection system 100, as shown in a second half of the waveforms (F) of FIG. 4.

Figure 3:
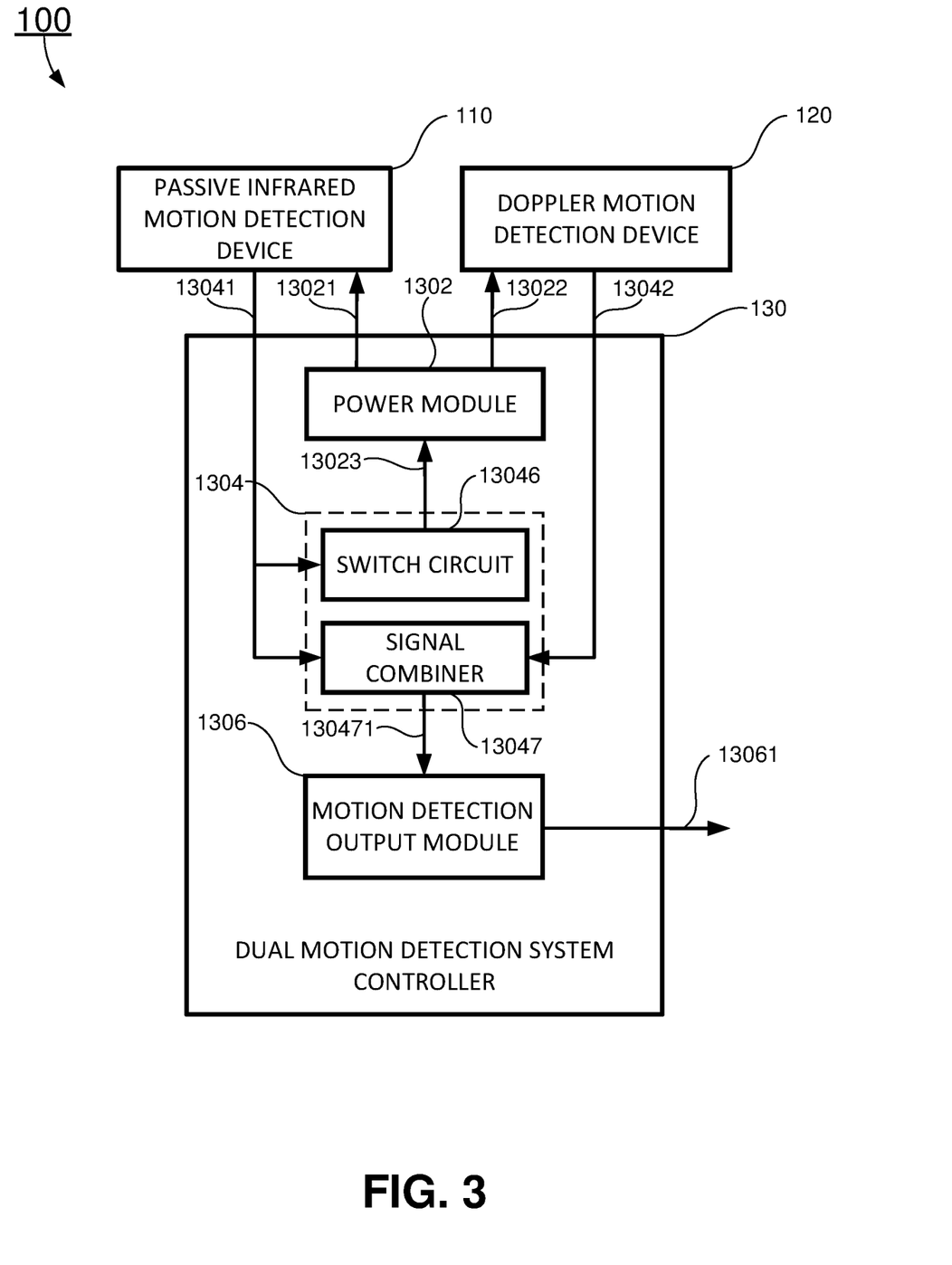
FIG. 3 shows a block diagram of another exemplary dual motion detection system according to another embodiment of the present disclosure.

In another embodiment, the logic control module 1304 may include: a switch circuit 13046 and a signal combiner 13047 as shown in FIG. 3. The switch circuit 13046 has an input of the positive object motion detection signal output 13041 from the from the PIR motion detection device 110, and an output of the power on signal 13023 to the power module 1302. The switch circuit 13046 provides the power on signal 13023 to the power module 1302 to turn on the RFD electrical power 13022 to allow the RFD motion detection device 120 to detect object motion when the switch circuit 13046 receives the positive PIR motion detection signal 13041 when the PIR motion detection device 110 detects object motion as shown in the first half of the waveform (B) of FIG. 4. The power module 1302 maintains the RFD electrical power 13022 for the period of time TW as shown in the first half of the waveform (C) of FIG. 4. The signal combiner 13047 has a first input of the positive PIR motion detection signal 13041 for receiving the positive PIR motion detection signal 13041 from the PIR motion detection device 110, a second input of the positive RFD motion detection signal 13042 for receiving the positive RFD motion detection signal 13042 from the RFD motion detection device 120, and an output of a third positive motion detection signal 130471. When the signal combiner 13047 receives the positive PIR motion detection signal 13041 from the PIR motion detection device 110 at the first input, and the positive RFD motion detection signal 13042 from the RFD motion detection device 120 at the second input, the signal combiner 13047 and transmits the third positive motion detection signal 130471 to the motion detection output module 1306 and the motion detection output module 1306 generates the positive motion detection output signal 13061 of the dual motion detection system 100 when the signal combiner 13047 receives the positive PIR motion detection signal 13041 and the positive RFD motion detection signal 13042 simultaneously and the signal combiner 13047 generates the third positive motion detection signal 130471.

When the PIR motion detection device 110 detects another object motion as shown in the second half of the waveform (B) of FIG. 4, the power module 1302 to provide the RFD electrical power 13022 as shown in the second half of the waveform (C) of FIG. 4 to the RFD motion detection device 120 to detect object motion when the motion detection input module 13043 receives the positive PIR motion detection signal 13041, the RFD motion detection device 120 does not detect object motion so the RFD motion detection device 120 does not generate the positive RFD motion detection signal 13042 as shown in the second half of the waveform (D) of FIG. 4, and the motion detection input module 13043 does not generate the positive object motion detection signal output 130431 as shown in the second half of the waveform (E) of FIG. 4 to the processor 13044, and therefore, the motion detection output module 1306 does not generate the positive motion detection output signal 13061 of the dual motion detection system 100, as shown in the second half of the waveforms (F) of FIG. 4.

In certain embodiments, the switch circuit 13046 includes a delayed switch circuit to turn on the RFD electrical power 13022 when the switch circuit 13046 receives the positive PIR motion detection signal 13041 and to maintain the RFD electrical power 13022 for the period of time TW. The signal combiner 13047 includes an AND gate circuit to provide the third positive motion detection signal 130471 to the motion detection output module 1306 when the signal combiner 13047 receives the positive PIR motion detection signal 13041 and the positive RFD motion detection signal 13042 simultaneously.

Figure 5:
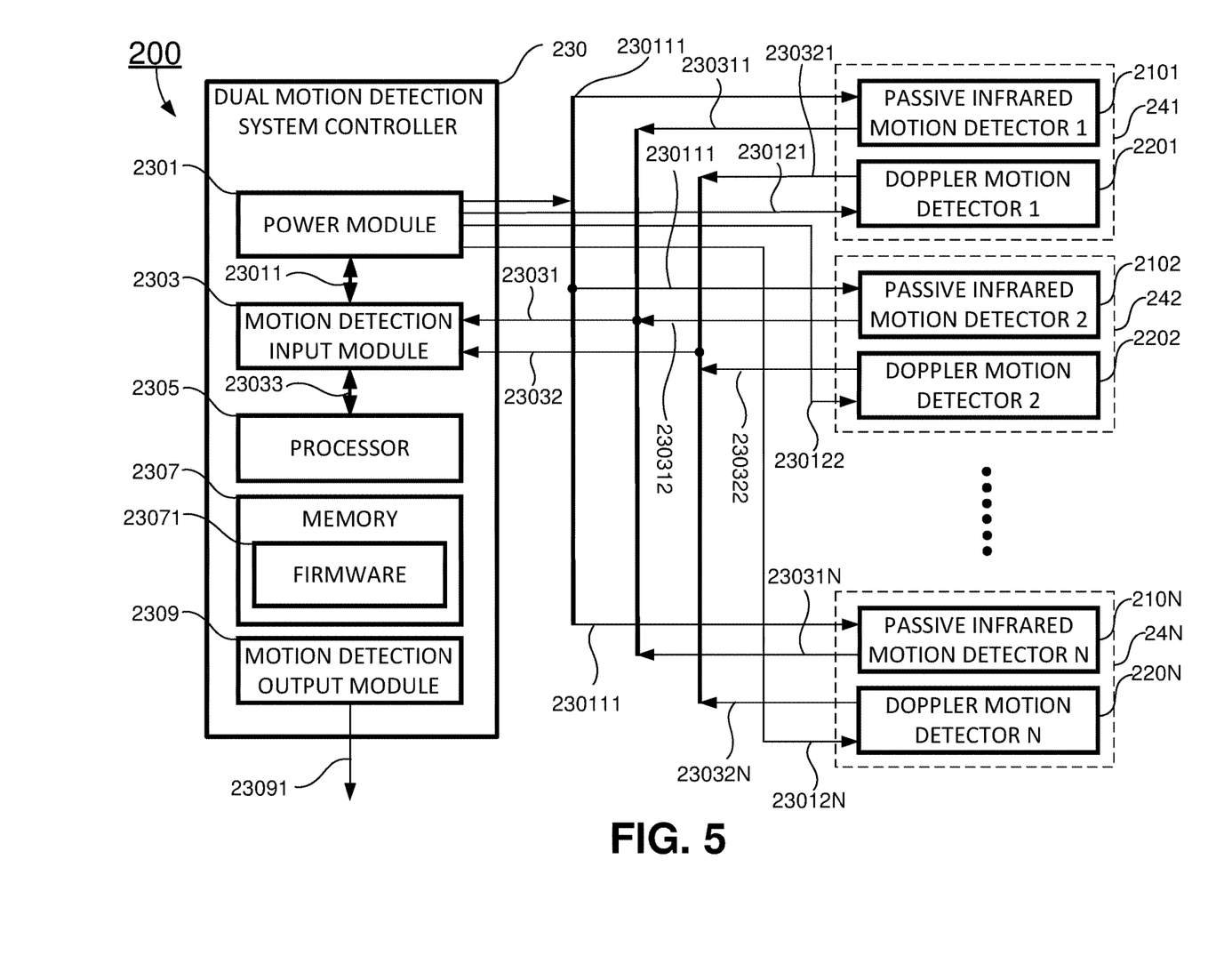
FIG. 5 shows a block diagram of an exemplary motion detection system having more than one sets of dual motion detection devices according to another embodiment of the present disclosure.

In another aspect, the present disclosure relates to a motion detection system 200 as shown in FIG. 5. In certain embodiments, the motion detection system 200 includes, a dual motion detection system controller 230 and N dual motion detection devices, where N is a positive integer. Each of the N dual motion detection devices includes a passive infrared (PIR) motion detector for detecting object motion using infrared and a radio frequency doppler (RFD) motion detector for detecting object motion using doppler effect. In the exemplary embodiment as shown in FIG. 5, the motion detection system 200 include a first dual motion detection device 241, a second dual motion detection device 241, . . . , and a N-th dual motion detection device 24N.

In certain embodiments, the first dual motion detection device 241 includes a first PIR motion detector 2101 and a first RFD motion detector 2201, the second dual motion detection device 242 includes a second PIR motion detector 2102 and a second RFD motion detector 2202, and the N-th dual motion detection device 24N includes an N-th PIR motion detector 210N, and an N-th RFD motion detector 220N. The first PIR motion detector 2101 includes an input of a PIR electrical power 230111, and an output of a first positive PIR motion detection signal 230311. The first RFD motion detector 2201 includes an input of a first RFD electrical power 230121, and an output of a first positive RFD motion detection signal 230321. The second PIR motion detector 2102 includes an input of the PIR electrical power 230111, and an output of a second positive PIR motion detection signal 230312. The second RFD motion detector 2202 includes an input of a second RFD electrical power 230122, and an output of a second positive RFD motion detection signal 230322. The N-th PIR motion detector 210N includes an input of the PIR electrical power 230111, and an output of an N-th positive PIR motion detection signal 23031N. The N-th RFD motion detector 220N includes an input of a N-th RFD electrical power 23012N, and an output of an N-th positive RFD motion detection signal 23032N.

In certain embodiments, the dual motion detection system controller 230 includes a power module 2301, a motion detection input module 2303, and a motion detection output module 2309. The power module 2301 provides electrical power to each of the N dual motion detection devices. In certain embodiments, the power module 2301 provides electrical power to each PIR motion detection device of the dual motion detection devices continuously through the PIR electrical power 230111. The power module 2301 provides N separate RFD electrical powers 23012I to each RFD motion detection device 220I of the I-th dual motion detection device 24I (where I=1, 2, . . . , and N) in a time-division manner when the corresponding PIR motion detection device 210I detects object motion during the period of time TW, and a time delay TD is added between two sequential object motion detections by two PIR motion detection devices of the dual motion detection devices. Each RFD motion detection device of the dual motion detection devices is used to confirm the positive PIR motion detection by the corresponding PIR motion detection device and reduce false motion detection using single motion detection device.

In certain embodiments, the motion detection input module 2303 includes a first input of a positive PIR motion detection signal 23031 from each of the N PIR motion detectors, and a second input of a positive RFD motion detection signal 23032 from each of the N RFD motion detectors. The motion detection input module 2303 also includes a first output of a power on signal 23011 to the power module 2301 to turn on the N RFD electrical power 23012I to allow I-th dual motion detection device 24I to detect objection when the I-th PIR motion detector 210I detects object motion, where I=1, 2, . . . , and N, and a second output of a positive motion detection signal 23033 to the processor 2305 when I-th dual motion detection device 24I detects object motion.

In one embodiment, a motion detection system 200, as partially shown in FIG. 5, includes a first dual motion detection device 241 and a second dual motion detection device 242. The waveforms at various points of the motion detection system 200 are shown as waveforms (A) through (I) of FIG. 6. The first PIR motion detector 2101 of the first dual motion detection device 241 and the second PIR motion detector 2102 of the second dual motion detection device 242 receives the PIR electrical power 230111 as shown in the waveform (A) of FIG. 6. As shown in the waveform (B) of FIG. 6, the first PIR motion detector 2101 detects object motion during a first time period T1 and a third time period T3. The motion detection input module 2303 receives the first positive PIR motion detection signal 230311 during the first time period T1 and the third time period T3. The motion detection input module 2303 generates a power on signal 23011 to the power module 2301 and the power module 2301 generates a first RFD electrical power 230121 to allow the first RFD motion detector 2201 to detect object motion, during the first time period T1 and the third time period T3. The first RFD electrical power 230121 maintains for a period of time TW during the first time period T1, and during the third time period T3 as shown in the waveform (C) of FIG. 6. The first RFD motion detector 2201 does not detect object motion during the first time period T1, and detects object motion during the third time period T3 as shown in the waveform (D) of FIG. 6.

Figure 6:
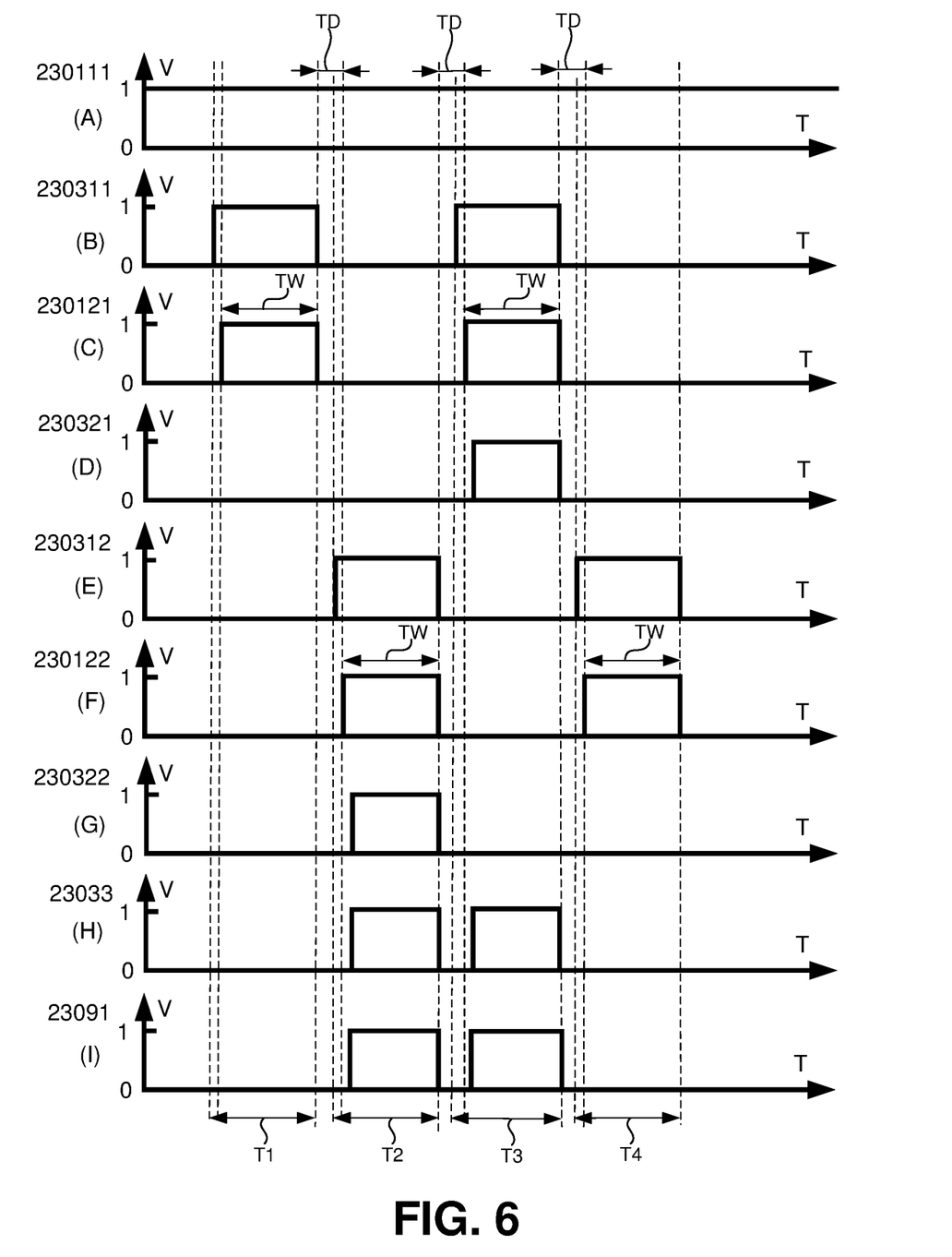
FIG. 6 shows a set of voltage waveforms of power supplies and motion detection signals at various points of dual motion detection devices of the motion detection system as shown in FIG. 5 according to certain embodiments of the present disclosure.

During a second time period T2 and a fourth time period T4, the second PIR motion detector 2102 detects object motion during the second time period T2 and the fourth time period T4, and the second PIR motion detector 2102 generates the second positive PIR motion detection signal 230312 as shown in waveform (E) of FIG. 6. The motion detection input module 2303 then generates another power on signal 23011 to turn on the second RFD electrical power 230122. The second RFD electrical power 230122 is turned on after the end of the period of time TW and a time delay TD during the second time period T2 and the fourth time period T4 such that the radio frequency doppler signals of the first RFD motion detector 2201 will not interfere with the radio frequency doppler signals of the second RFD motion detector 2202, as shown in the waveform (F) of FIG. 6. During the second time period T2, the second RFD motion detector 2202 detects object motion, and during the fourth time period T4, the second RFD motion detector 2202 does not detect object motion. The second RFD motion detector generates a second positive RFD motion detection signal 230322 as shown in the waveform (G) of FIG. 6.

During the first time period T1, the first positive PIR motion detection signal 230311 and the first positive RFD motion detection signal 230312 are not positive simultaneously, therefore, there is no motion detection during the first time period T1. During the second time period T2, the second positive PIR motion detection signal 230312 and the second positive RFD motion detection signal 230322 are both positive simultaneously, object motion is detected during the second time period T2. The motion detection input module 2303 generates a positive motion detection signal 23033 as shown in the waveform (H) of FIG. 6 to the processor 2305 and the processor 2305 instructs the motion detection output module 2309 to generate a positive motion detection output signal 23091 as shown in the waveform (I) of FIG. 6. During the third time period T3, the first positive PIR motion detection signal 230311 and the first positive RFD motion detection signal 230312 are both positive simultaneously, object motion is detected during the third time period T3. The motion detection input module 2303 generates another positive motion detection signal 23033 as shown in the waveform (H) of FIG. 6 to the processor 2305 and the processor 2305 instructs the motion detection output module 2309 to generate a positive motion detection output signal 23091 as shown in the waveform (I) of FIG. 6. During the fourth time period T4, the second positive PR motion detection signal 230321 and the second positive RFD motion detection signal 230322 are not positive simultaneously, therefore, there is no motion detection during the fourth time period T4.

Figure 7:
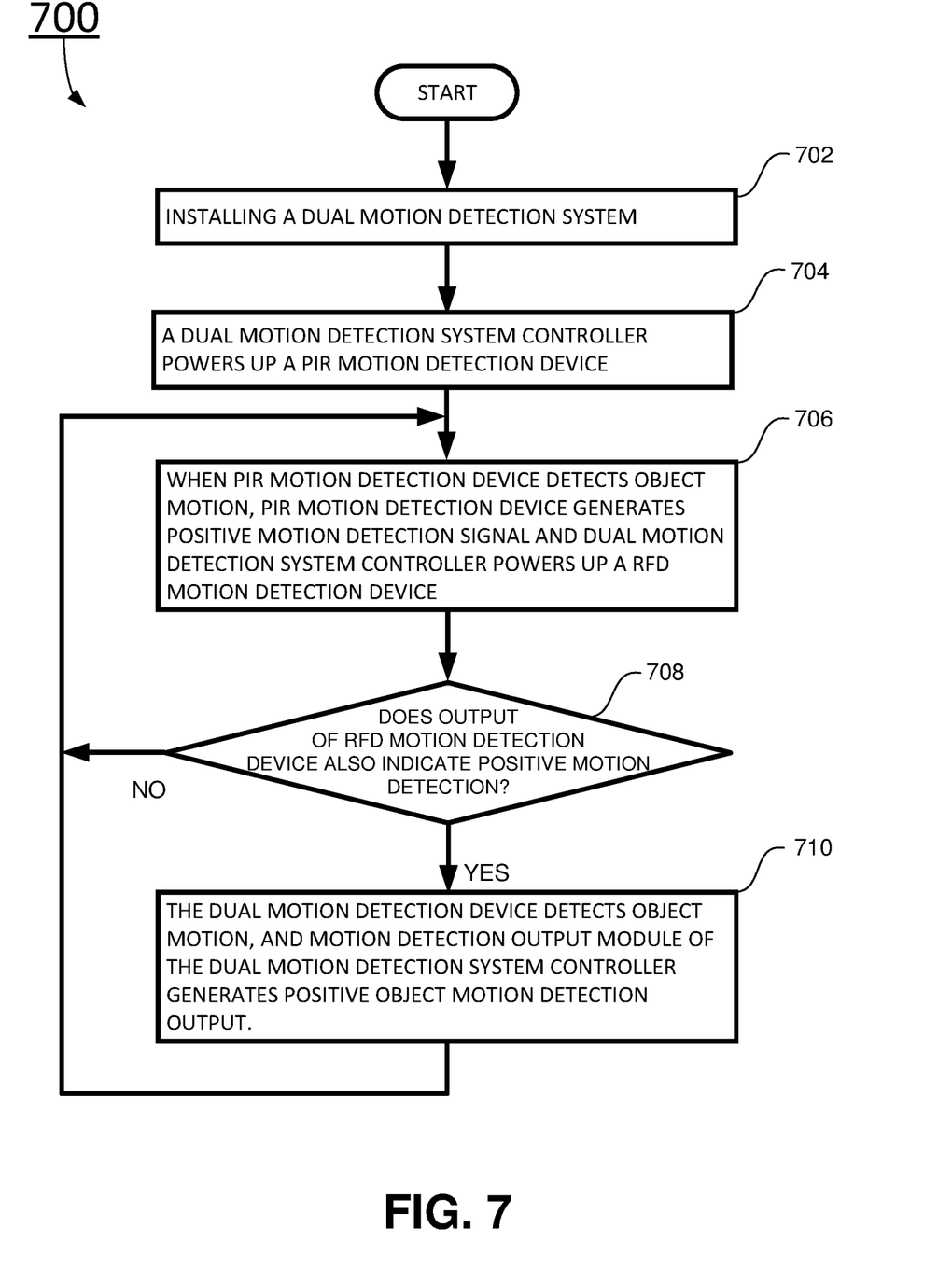
FIG. 7 shows a flow chart of a method using a dual motion detection system according to certain embodiments of the present disclosure.

In yet another aspect, the present disclosure relates to a method 700 of using a dual motion detection system 100 to detect object motion as shown in FIG. 7.

At block 702, an operator installs a dual motion detection system 100 as shown in FIGS. 2 and 3. The dual motion detection system 100 includes: at least one PIR motion detection device 110, at least one RFD motion detection device 120, and a dual motion detection system controller 130. The PIR motion detection device 110 includes an input of a PR electrical power 13021 and an output of a positive PR motion detection signal 13041. The PR motion detection device 110 detects motion of an object radiating infrared light and generates the positive PR motion detection signal 13041 when the PIR motion detection device 110 detects object motion. The RFD motion detection device 120 includes an input of a RFD electrical power 13022 and an output of a positive RFD motion detection signal 13042. The RFD motion detection device 120 detects motion of the object using doppler effect and generates the positive RFD motion detection signal 13042 when the RFD motion detection device 120 detects object motion. The RFD motion detection device 120 is used to confirm a positive PR motion detection by the PR motion detection device 110 and reduce false motion detection using single motion detection device.

In certain embodiments, the dual motion detection system controller 130 includes a power module 1302 for providing electrical power to the PIR motion detection device 110 and the RFD motion detection device 120, a logic control module 1304 for receiving the positive PIR motion detection signal 13041 and the positive RFD motion detection signal 13042, and a motion detection output module 1306 for generating a positive motion detection output signal 13061 of the dual motion detection system 100 when the logic control module 1304 receives the positive PIR motion detection signal 13041 and the positive RFD motion detection signal 13042 simultaneously. The power module 1302 includes a first output of the PIR electrical power 13021 to the PIR motion detection device 110, a second output of the RFD electrical power 13022 to the RFD motion detection device 120, and a power on signal input 13023 from the logic control module 1304.

At block 704, the dual motion detection system controller 130 powers up the PIR motion detection device 110 to allow the PIR motion detection device 110 to detect object motion.

At block 706, when the PIR motion detection device 110 detects object motion, the output of the PIR motion detection device 110 generates the positive PIR motion detection signal 13041 and the positive PIR motion detection signal 13041 is transmitted to the logic control module 1304 to generate a power on signal 13023. The power on signal 13023 is transmitted to the power module 1302 to turn on the RFD electrical power 13022 to the RFD motion detection device 120 to enable the RFD motion detection device 120 to detect object motion. The RFD electrical power 13022 maintains a period of time TW. The RFD motion detection device 120 is used to confirm a positive PIR motion detection by the PIR motion detection device 110 and reduce false motion detection using single motion detection device.

At query block 708, the dual motion detection system controller 130 determines whether the RFD motion detection device 120 detects object motion by checking whether the logic control module 1304 receives the positive RFD motion detection signal 13042 from the RFD motion detection device 120. When the logic control module 1304 receives the positive RFD motion detection signal 13042 from the RFD motion detection device 120, the method proceed to block 708. Otherwise, the method goes back to block 704 to continue motion detection.

At block 710, when the logic control module 1304 receives the positive RFD motion detection signal 13042 from the RFD motion detection device 120, the RFD motion detection device 120 confirms the motion detection by the PIR motion detection device 110 and therefore the dual motion detection system 100 detects object motion. The dual motion detection system controller 130 instructs a motion detection output device 1306 of the dual motion detection system 100 to generate a positive motion detection signal 13061 to indicate that the dual motion detection system 100.

In certain embodiments, a dual motion detection system 200 as shown in FIG. 5, includes a dual motion detection system controller 230 and N dual motion detection devices 24I, where I=1, 2, . . . , and N, N is a positive integer. Each of the dual motion detection devices includes a passive infrared (PIR) motion detector for detecting object motion using infrared and a radio frequency doppler (RFD) motion detector for detecting object motion using doppler effect. The dual motion detection system controller includes a power module for providing electrical power to each of the dual motion detection devices. The power module provides electrical power to each PIR motion detector of the dual motion detection devices continuously. The power module provides electrical power to each RFD motion detector of the dual motion detection devices in a time-division manner when the corresponding PIR motion detector detects object motion during a period of time TW. A time delay TD is added between two sequential object motion detections by two PIR motion detectors to avoid radio frequency signal interference between two subsequent RFD motion detectors. Each RFD motion detector of the dual motion detection devices is used to confirm the positive PIR motion detection by the corresponding PIR motion detector and reduce false motion detection using single motion detector.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A dual motion detection system comprising:
    at least one passive infrared (PIR) motion detection device for detecting motion of an object radiating infrared light and generating a positive PIR motion detection signal when the PIR motion detection device detects object motion;
    at least one radio frequency doppler (RFD) motion detection device for detecting motion of the object using doppler effect and generating a positive RFD motion detection signal when the RFD motion detection device detects object motion; and
    a dual motion detection system controller having a power module for providing electrical power to the PIR motion detection device and the RFD motion detection device, a motion detection output module for generating a positive motion detection output signal of the dual motion detection system, and a logic control module,
    wherein the power module provides a PIR electrical power to the PIR motion detection device, when the PIR motion detection device detects object motion the PIR motion detection device transmits the positive PIR motion detection signal to the logic control module, the logic control module sends a power on signal to the power module to turn on a RFD electrical power to the RFD motion detection device for a period of time TW to allow the RFD motion detection device to detect motion, when the RFD motion detection device detects object motion, the RFD motion detection device generates the positive RFD motion detection signal and transmits the positive RFD motion detection signal to the logic control module, the power module turns off the RFD electrical power to the RFD motion detection device at the end of period of time TW, when the logic control module receives the positive PIR motion detection signal and the positive RFD motion detection signal simultaneously during the period of time TW, the motion detection output module provides the positive motion detection output signal of the dual motion detection system indicating the dual motion detection system has detected object motion.

2. The dual motion detection system according to claim 1, wherein the power module provides the PIR electrical power to the PIR motion detection device continuously.

3. The dual motion detection system according to claim 1, wherein the power module provides the RFD electrical power to the RFD motion detection device only when the PIR motion detection device detects object motion during the period of time TW.

4. The dual motion detection system according to claim 1, wherein the RFD motion detection device is used to confirm the positive PIR motion detection by the PIR motion detection device and reduce false motion detection using single motion detection device.

5. The dual motion detection system according to claim 1, wherein the logic control module comprises:
    a motion detection input module for receiving the positive PIR motion detection signal and the positive RFD motion detection signal;
    a processor and a memory having firmware storing computer executable instructions, when executed by the processor, the computer executable instructions cause the processor to:
    instruct the power module to provide the PIR electrical power to the PIR motion detection device to detect object motion;
    send the power on signal to the power module to provide the RFD electrical power to the RFD motion detection device to detect object motion, when the motion detection input module receives the positive PIR motion detection signal; and
    instruct the motion detection output module to generate the positive motion detection output signal of the dual motion detection system when the motion detection input module receives the positive PIR motion detection signal and the positive RFD motion detection signal simultaneously.

6. The dual motion detection system according to claim 1, wherein the logic control module comprises:
    a switch circuit to provide the power on signal to the power module to turn on the RFD electrical power to the RFD motion detection device to detect object motion when the logic control module receives the positive PIR motion detection signal; and a signal combiner to generate a third positive motion detection signal and to transmit the third positive motion detection signal to the motion detection output module to generate the positive motion detection output signal of the dual motion detection system when the signal combiner receives the positive PIR motion detection signal and the positive RFD motion detection signal simultaneously.

7. The dual motion detection system according to claim 6, wherein the switch circuit comprises a delayed switch circuit to turn on the RFD electrical power when the switch circuit receives the positive PIR motion detection signal and to maintain the RFD electrical power for the period of time TW.

8. The dual motion detection system according to claim 6, wherein the signal combiner comprises an AND gate circuit to provide the third positive motion detection signal to the motion detection output module when the signal combiner receives the positive PIR motion detection signal and the positive RFD motion detection signal.

9. A motion detection system comprising:
a plurality of dual motion detection devices, wherein each of the plurality of dual motion detection devices comprises a PIR motion detector for detecting object motion using infrared and a RFD motion detector for detecting object motion using doppler effect; and
a dual motion detection system controller having a power module for providing electrical power to each of the plurality of dual motion detection devices, a motion detection output module for generating a positive motion detection output signal of the motion detection system, a motion detection input module, a processor, and a memory having firmware storing computer executable instructions, when executed by the processor, the computer executable instructions cause the processor to,
instruct the power module to provide a PIR electrical power to each PIR motion detector of the plurality of dual motion detection devices to allow each PIR motion detection device to detect object motion;
instruct the power module to provide a first RFD electrical power to a first RFD motion detector of a first dual motion detection device for a period of time TW to allow the first RFD motion detector to detect motion, when a first PIR motion detector of the dual motion detection device detects object motion and transmits a first positive IR motion detection signal to the motion detection input module; and
instruct the motion detection output module to provide the positive motion detection output signal of the motion detection system when the motion detection input module receives a first positive PIR motion detection signal from the first PIR motion detector and a first positive RFD motion detection signal from the first RFD motion detector.

10. The motion detection system according to claim 9, wherein when a second PIR motion detector of a subsequent second dual motion detection device detects object motion and transmits a second positive PIR motion detection signal to the motion detection input module, the computer executable instructions cause the processor to,
instruct the power module to provide another RFD electrical power to a second RFD motion detector of the second dual motion detection device for a period of time TW to allow the second RFD motion detector to detect motion, wherein the RFD electrical power is turned on after the end of the first period of time TW plus a time delay TD; and
instruct the motion detection output module to provide the positive motion detection output signal of the motion detection system when the motion detection input module receives the second positive PIR motion detection signal from the second PIR motion detector and the second positive RFD motion detection signal from the second RFD motion detector.

11. The motion detection system according to claim 9, wherein the power module provides electrical power to the each PIR motion detection device of the plurality of dual motion detection devices continuously.

12. The motion detection system according to claim 9, wherein the power module provides electrical power to each RFD motion detection device of the plurality of dual motion detection devices in a time-division manner when the corresponding PIR motion detection device detects object motion during the period of time TW, and a time delay TD is added between two sequential object motion detections by two PIR motion detection devices.

13. The motion detection system according to claim 9, wherein each RFD motion detection device of the plurality of dual motion detection devices is used to confirm the positive PIR motion detection by the corresponding PIR motion detection device and reduce false motion detection using single motion detection device.

14. A method of using a motion detection system to detect object motion, comprising:
installing, by a user, the motion detection system, wherein the motion detection system comprises a dual motion detection system controller and a plurality of dual motion detection devices, and each of the plurality of dual motion detection devices comprises a PIR motion detector for detecting object motion using infrared and a RFD motion detector for detecting object motion using doppler effect;
providing, by a power module of the dual motion detection system controller, a PIR electrical power to each of the plurality of PIR motion detector devices;
sending, by a motion detection input module, a power on signal to the power module to turn on a RFD electrical power to the corresponding RFD motion detector for a period of time TW to allow the RFD motion detector to detect motion, when a first PIR motion detector detects object motion and transmits a first positive PIR motion detection signal to the motion detection input module;
receiving, by the motion detection input module, a first positive RFD motion detection signal from a first corresponding RFD motion detector, when the first corresponding RFD motion detector detects object motion; and
generating, by a motion detection output module of the dual motion detection system controller, a positive motion detection output signal of the motion detection system indicating the motion detection system has detected object motion.

15. The method according to claim 14, wherein when a second PIR motion detector of a subsequent second dual motion detection device detects object motion and transmits a second positive PIR motion detection signal to the motion detection input module, the method further comprises:
providing, by the power module, a RFD electrical power to a second RFD motion detector of the second dual motion detection device for a period of time TW to allow the second RFD motion detector to detect motion, wherein the RFD electrical power is turned on after the end of the first period of time TW plus a time delay TD;

receiving, by the motion detection input module, a second positive RFD motion detection signal from the corresponding second RFD motion detector, when the corresponding second RFD motion detector detects object motion; and generating, by the motion detection output module of the dual motion detection system controller, another positive motion detection output signal of the motion detection system indicating the motion detection system has detected object motion.

16. The method according to claim 14, wherein the dual motion detection system controller comprises:

the power module for providing electrical power to each of the plurality of dual motion detection devices.

17. The method according to claim 16, wherein the power module provides electrical power to each PIR motion detector of the plurality of dual motion detection devices continuously.

18. The method according to claim 16, wherein the power module provides electrical power to each RFD motion detector of the plurality of dual motion detection devices in a time-division manner when the corresponding PIR motion detector detects object motion during the period of time TW, and a time delay TD is added between two sequential object motion detections by two PIR motion detectors.

19. The method according to claim 14, wherein each of the plurality of RFD motion detectors is used to confirm the positive PIR motion detection by the corresponding PIR motion detector and reduce false motion detection using single motion detector.

20. The method according to claim 14, wherein the dual motion detection system controller comprises:

the motion detection input module for receiving positive PIR motion detection signals from each PIR motion detector of the plurality of dual motion detection devices, and receiving positive RFD motion detection signals from each RFD motion detector of the plurality of dual motion detection devices; and the motion detection output module for generating the positive motion detection output signal of the motion detection system when the motion detection input module receives at least one positive PIR motion detection signal from a PIR motion detector of the dual motion detection device and a corresponding positive RFD motion detection signal from a corresponding RFD motion detector of the dual motion detection device.

* * * * *